(12) United States Patent
Nakata (10) Patent No.: US 7,586,639 B2
(45) Date of Patent: Sep. 8, 2009

(54) INFORMATION PROCESSING APPARATUS, PRINT PROCESSING METHOD, AND COMPUTER PROGRAM

(75) Inventor: Hiroaki Nakata, Kawasaki (JP)

(73) Assignee: Canon Kabuhsiki Kaisha, Tokyo (JP)

( * ) Notice: Subject to any disclaimer, the term of this patent is extended or adjusted under 35 U.S.C. 154(b) by 832 days.

(21) Appl. No.: 11/190,962

(22) Filed: Jul. 28, 2005

(65) Prior Publication Data

US 2006/0023230 A1 Feb. 2, 2006

(30) Foreign Application Priority Data

Jul. 30, 2004 (JP) ............................... 2004-223254

(51) Int. Cl.
*G06F 15/00* (2006.01)
*G06K 1/00* (2006.01)
(52) U.S. Cl. ...................... 358/1.6; 358/1.15; 358/1.18
(58) Field of Classification Search ........ 358/1.13–1.18
See application file for complete search history.

(56) References Cited

U.S. PATENT DOCUMENTS

| 6,188,868 | B1 | 2/2001 | Shiramura |
| 6,308,041 | B2 | 10/2001 | Shiramura |
| 6,406,199 | B1 | 6/2002 | Hayashi |
| 7,248,383 | B2 | 7/2007 | Yoshida et al. |
| 7,400,427 | B2 * | 7/2008 | Honma ...................... 358/1.15 |
| 2001/0016124 | A1 | 8/2001 | Shiramura |
| 2003/0165616 | A1 | 9/2003 | Yukinobu et al. ........... 427/125 |
| 2003/0170448 | A1 | 9/2003 | Yukinobu et al. ........... 428/328 |
| 2004/0061894 | A1 | 4/2004 | Yoshida et al. |
| 2006/0066907 | A1 | 3/2006 | Nakata et al. ............... 358/3.1 |

FOREIGN PATENT DOCUMENTS

| EP | 0 902 391 A2 | 3/1999 |
| EP | 1 363 186 A1 | 11/2003 |
| EP | 0 902 391 B1 | 4/2004 |
| EP | 1 811 430 A2 | 4/2007 |
| JP | 2000-187580 | 7/2000 |
| JP | 2001-014255 | 1/2001 |
| JP | 2001-235977 | 8/2001 |
| JP | 2002-255439 | 9/2002 |
| JP | 2003-057999 | 2/2003 |
| JP | 2004-78997 | 3/2004 |
| WO | WO 02/067106 | 8/2002 |

* cited by examiner

*Primary Examiner*—Edward L Coles
*Assistant Examiner*—Satwant K Singh
(74) *Attorney, Agent, or Firm*—Fitzpatrick, Cella, Harper & Scinto (57) ABSTRACT

A mechanism in which whether or not a printing process can be executed in a user's desired format can be recognized by the user before a print output is executed from an application is provided. The application inquires of a printer driver about a restriction value of a printing apparatus in the case of executing the printing process by print setting designated by the user and obtains such a value. Whether or not the printing process can be executed is discriminated on the basis of the obtained print restriction value information and the number of pages of a print document. If it is determined that the printing process cannot be executed, a message showing that it is impossible to execute the printing process is displayed onto a displaying apparatus. If the printing process cannot be executed, the user is allowed to select available print settings.

6 Claims, 9 Drawing Sheets

| SHEET SIZE / SHEET TYPE | A3, 11×17 | B4, LGL | A4, B5, LTR |
|---|---|---|---|
| PLAIN PAPER | 15 SHEETS | 20 SHEETS | 30 SHEETS |
| THICK PAPER | 10 SHEETS | 15 SHEETS | 20 SHEETS |

STAPLE RESTRICTION INFORMATION ☒

⚠ IF THE PRINTING IS EXECUTED IN THE CURRENT SETTING, SINCE THE NUMBER OF PRINT SHEETS EXCEEDS THE NUMBER OF STAPLE-POSSIBLE PAGES, THE STAPLING IS NOT EXECUTED.

> MAX. NUMBER OF STAPLE-POSSIBLE PAGES: 20
> THE NUMBER OF PRINT SHEETS FROM THE APPLICATION: 35

IN THE CASE OF PRINTING WITHOUT PERFORMING THE STAPLE-BINDING, SELECT "NOT CHANGE". IN THE CASE OF PERFORMING STAPLE-PRINTING AFTER CHANGING TO THE STAPLE-POSSIBLE PRINT SETTING, SELECT OTHERS, THEN, CLICK "OK".

- ⦿ NOT CHANGE

- ○ PAGE LAYOUT: "1 PAGE/SHEET" → "2 PAGES/SHEET"
  THE NUMBER OF OUTPUT SHEETS AFTER THE CHANGE: 18

- ○ PAGE LAYOUT: "1 PAGE/SHEET" → "4 PAGES/SHEET"
  THE NUMBER OF OUTPUT SHEETS AFTER THE CHANGE: 9

- ○ PRINTING METHOD: "SIMPLEX PRINTING" → "DUPLEX PRINTING"
  THE NUMBER OF OUTPUT SHEETS AFTER THE CHANGE: 18

[ OK ]   [ CANCEL ]

INFORMATION PROCESSING APPARATUS, PRINT PROCESSING METHOD, AND COMPUTER PROGRAM

BACKGROUND OF THE INVENTION

1. Field of the Invention

The invention relates to an information processing apparatus, a print processing method, and a computer program and, more particularly, the invention is suitable when it is used to execute a process for binding printed sheets by a stapler, or the like.

2. Related Background Art

A laser beam printer and a network digital hybrid apparatus each having a mechanism for automatically binding print-out (printed) print sheets by a stapler on a device as they are (hereinbelow, such a function is called "staple-binding") have been widespread mainly in offices. In such a printer, a printer driver is used when the user designates whether or not the staple-binding printing is executed.

Figure 9:
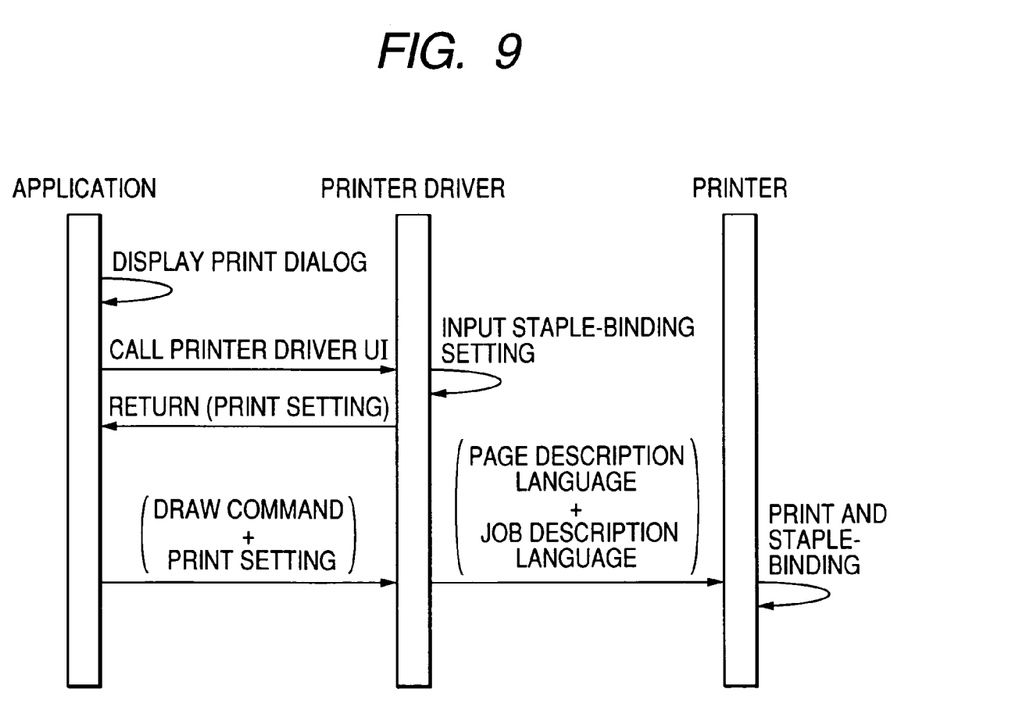
FIG. 9 shows a conventional technique and is a diagram showing an example of a flow for processes in a host computer and a printer in the case of executing staple-binding printing through a printer driver.

FIG. 9 shows an example of a flow of processes in a host computer and a printer in the case of executing the staple-binding printing through the printer driver.

First, a print dialog of an application is opened from an application program on the host computer and displayed. Further, a user interface of the printer driver (printer driver UI) is opened and the user is made to input print setting regarding the staple-binding into the printer driver UI. A page description language and a job description language are formed by the printer driver on the basis of the print setting and a draw command. The staple-binding printing is executed on the basis of the page description language and the job description language.

However, the staple-binding designated by the user is not always executed after the printed sheets were outputted by the printer. This is because, in each printer, the number of pages of the sheets which can be staple-bound has an upper limit as a specification of the device and the upper limit number changes in dependence on a size, type, or the like of the sheet.

Therefore, if the number of pages of print data sent from the host computer by a print instruction of the user is larger than the number of pages which can be staple-bound in the printer, in many cases, an original is printed out as it is without executing the staple-binding. Thus, only the original is delivered to an output tray.

As a measure for solving such a problem, as shown in JP-A-2000-187580, there is such a technique that in the printer driver, the draw command inputted from the application is converted into intermediate data and spooled, the number of print sheets is counted, whether or not the counted number of print sheets exceeds the upper limit of the number of pages of the sheets which can be staple-bound by the printer is discriminated, and if it is decided that the count value exceeds it, the intermediate data is divided into a plurality of print jobs in accordance with a unit of the number of print sheets to be staple-bound, and the printed sheets are staple-bound every print job.

However, according to the technique disclosed in JP-A-2000-187580, there is such a problem that even if the user wants to staple-bind the document to be printed in a lump, since the unit for staple-binding is changed, printed matter which is desired by the user cannot be obtained.

Therefore, in the printer driver disclosed in JP-A-2000-187580, there is a method whereby when whether or not the counted number of print sheets exceeds the upper limit of the number of pages of the sheets which can be staple-bound by the printer is discriminated, a warning dialog is displayed, thereby informing him of it. However, according to such a mechanism, only after the print instruction was made once by the application and the draw command was outputted to the printer driver, the user can recognize whether or not the staple-binding can be performed, so that ease of use deteriorates.

The application can obtain print ability of a certain degree from the printer driver through "Windows" (registered trademark) OS (Operating System: hereinafter, abbreviated to OS) of Microsoft Corporation in U.S.A. However, since the print ability differs every printer manufacture or every printer kind, the print ability which can be obtained by the application from the printer driver is limited only to the very standard ability defined by the OS and only the very simple setting of the print dialog which is opened from the application can be made.

Figure 10:
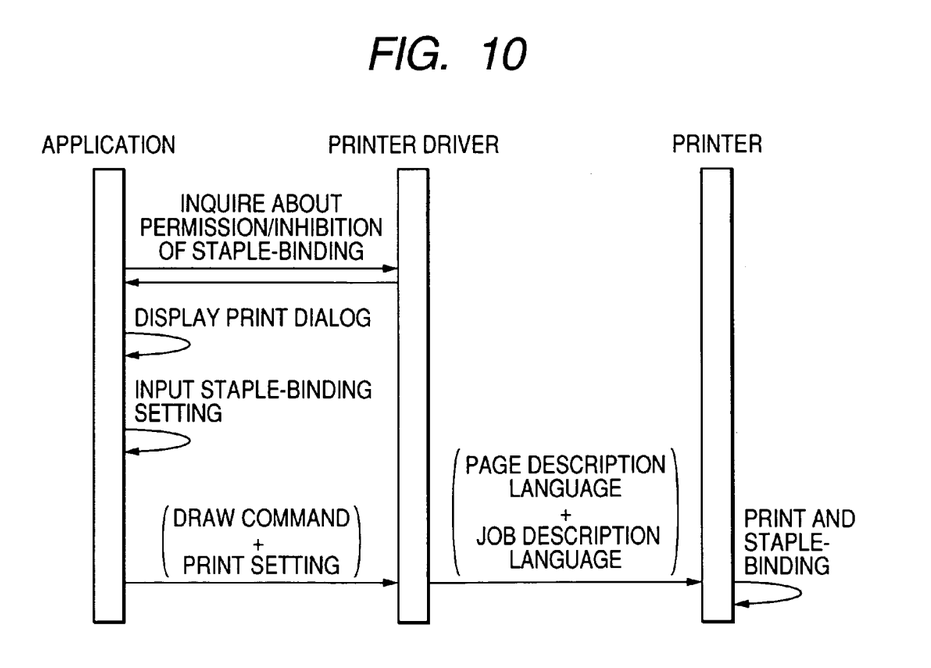
FIG. 10 shows the conventional technique and is a diagram showing another example of a flow for processes in the host computer and the printer in the case of executing the staple-binding printing through the printer driver.

However, in future, it is predicted that by further extending the OS, the detailed print ability of each printer driver which could not be obtained hitherto can be obtained through the OS. FIG. 10 shows an example of a flow for processes in the host computer and the printer in the case of staple-binding the printed sheets through the printer driver in a future print system.

First, the application on the host computer inquires of the printer driver through the OS (not shown) about the presence or absence of a print setting item for performing the staple-binding through an API (Application Programming Interface) or the like. If the print setting item for performing the staple-binding exists, an input item to designate the staple-binding is displayed onto a print dialog of the application, thereby allowing the user to input the staple-binding setting. The page description language and the job description language are formed by the printer driver on the basis of the print setting and the draw command. The staple-binding printing is executed on the basis of the page description language and the job description language.

However, as mentioned above, in each printer, since the number of pages of the sheets which can be staple-bound has the upper limit as a specification of the device, the staple-binding designated by the user is not always executed after the printed sheets were outputted by the printer.

When considering a print workflow of the user, it is important to previously notify the user whether or not a print job to be issued is a job which can perform the staple-binding. However, according to the conventional technique, means for notifying the user of such information before the print instruction (draw command) is outputted from the application does not exist in the application. There is, consequently, such a problem that whether or not the staple-binding is executed cannot be recognized until the print data is outputted to the printer or until a forming process of the print data by the printer driver is executed.

SUMMARY OF THE INVENTION

As mentioned above, the conventional technique has a problem of occurrence of the case where the printer cannot process the print job for a plurality of print sheets in accordance with the print setting.

The invention is made in consideration of the problem and it is an object of the invention to provide a mechanism in which whether or not a printing process can be executed in a user's desired format as much as possible can be recognized by the user before a print output is executed from an application.

According to the invention, there is provided an information processing apparatus as a host computer having an application for making the user designate print setting to execute a printing process of a print document and a printer driver for controlling a printing apparatus, comprising: an inquiry unit adapted to inquire of the printer driver by the application about a restriction value of the printing apparatus in the case of executing the printing process in accordance with the print setting designated by the user; an obtaining unit adapted to obtain print restriction value information, as a reply to the inquiry by the inquiry unit, regarding the restriction value of the printing apparatus in the case of executing the printing process in accordance with the print setting designated by the user from the printer driver; a discriminating unit adapted to discriminate whether or not the printing process can be executed in accordance with the print setting designated by the user on the basis of the print restriction value information obtained by the obtaining unit and the number of pages of the print document; and a display unit adapted to display a message showing that it is impossible to execute the printing process to a displaying apparatus if it is determined by the discriminating unit that the printing process cannot be executed.

According to the invention, there is provided a print processing method in an information processing apparatus having an application for making the user designate print setting to execute a printing process of a print document and a printer driver for controlling a printing apparatus, comprising: inquiring of the printer driver by the application about a restriction value of the printing apparatus in the case of executing the printing process in accordance with the print setting designated by the user; obtaining, from the printer driver by the application, print restriction value information, as a reply to the inquiry by the inquiry step, regarding the restriction value of the printing apparatus in the case of executing the printing process in accordance with the print setting designated by the user; discriminating, by the application, whether or not the printing process can be executed in accordance with the print setting designated by the user on the basis of the print restriction value information obtained by the obtaining step and the number of pages of the print document; and displaying a message showing that it is impossible to execute the printing process onto a displaying apparatus if it is determined by the discriminating step that the printing process cannot be executed.

According to the invention, there is provided a computer program for allowing a computer to execute a print processing method in an information processing apparatus having an application for making the user designate print setting to execute a printing process of a print document and a printer driver for controlling a printing apparatus, wherein the program comprises: inquiring of the printer driver by the application about a restriction value of the printing apparatus in the case of executing the printing process in accordance with the print setting designated by the user; obtaining, from the printer driver by the application, print restriction value information, as a reply to the inquiry by the inquiry step, regarding the restriction value of the printing apparatus in the case of executing the printing process in accordance with the print setting designated by the user; discriminating, by the application, whether or not the printing process can be executed in accordance with the print setting designated by the user on the basis of the print restriction value information obtained by the obtaining step and the number of pages of the print document; and displaying a message showing that it is impossible to execute the printing process onto a displaying apparatus if it is determined by the discriminating step that the printing process cannot be executed.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

An embodiment of the invention will be described hereinbelow with reference to the drawings.

Figure 1:
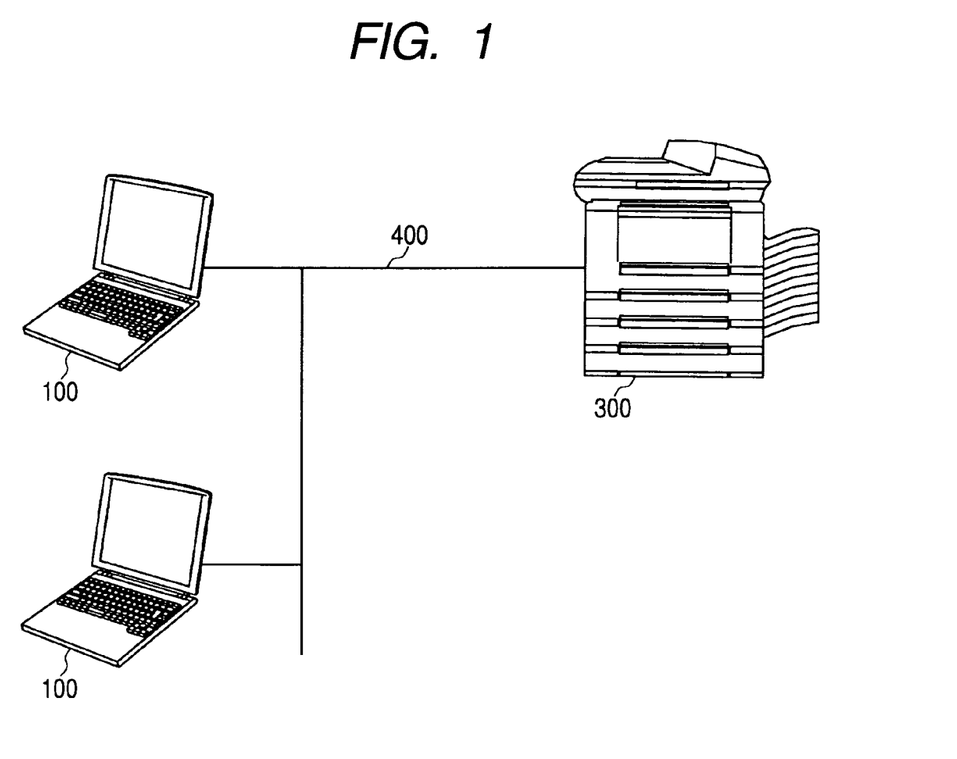
FIG. 1 shows an embodiment of the invention and is a diagram showing an example of a construction of a print system.

FIG. 1 is a diagram showing an example of a construction of a print system in the embodiment. As shown in FIG. 1, the print system in the embodiment is constructed by having one or a plurality of host computers 100 (corresponding to information processing apparatuses in the invention) and a laser beam printer 300 (printing apparatus). It is assumed that the laser beam printer 300 has means for staple-binding a plurality of printed-out pages on the printer. Naturally, it is not always necessary to use the laser beam printer 300 so long as an apparatus having a function which can process the printed sheets by executing a process such as staple-binding or the like is used.

The host computer 100 and the laser beam printer 300 are connected through a communication medium 400 constructed by using a network such as Ethernet (registered trademark) or the like or a dedicated interface. A print job is transferred from the host computer 100 to the laser beam printer 300.

Figure 2:
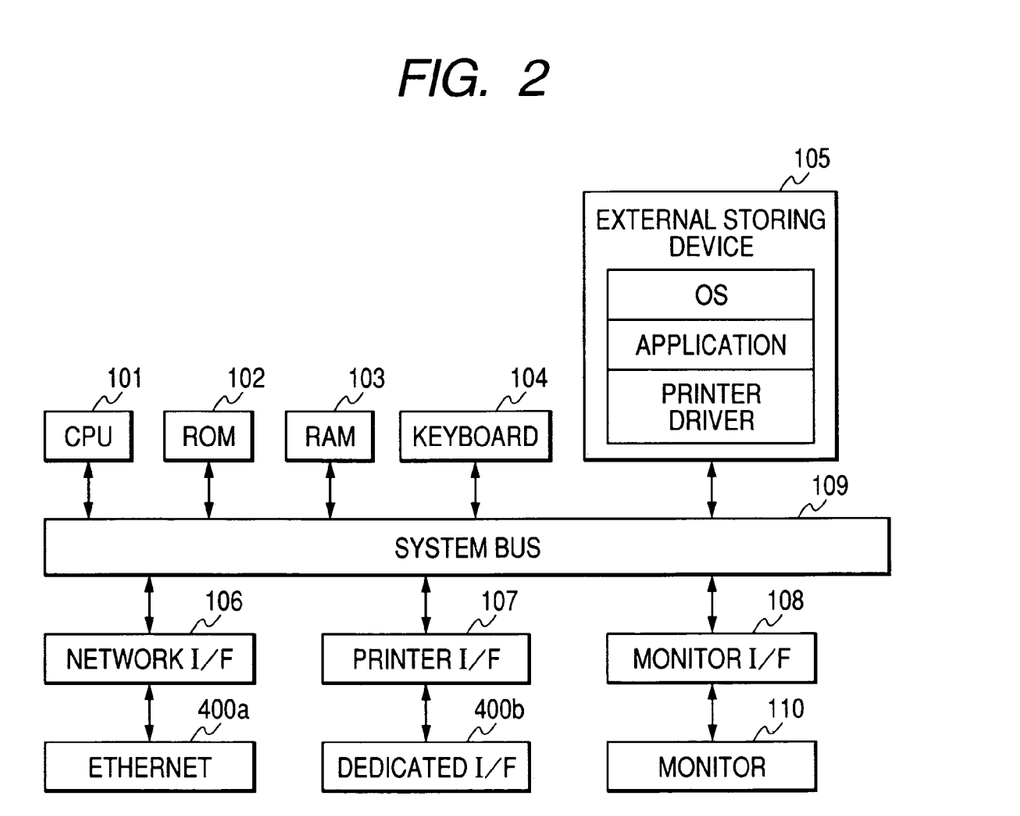
FIG. 2 shows the embodiment of the invention and is a block diagram showing an example of a construction of an internal system of a host computer.

FIG. 2 is a block diagram showing an example of a construction of an internal system of the host computer 100 as a general computer.

In FIG. 2, a CPU 101 controls the whole apparatus in accordance with a program stored in a ROM 102, a RAM 103, or an external storing device 105. The RAM 103 is used as a work area when the CPU 101 executes various processes.

The external storing device 105 records an operating system (OS), application software as a computer program which can be read by the computer of the invention, printer driver software, and the like. A keyboard 104 or an input device such as a mouse (not shown) or the like is a device which is used for the user to issue various instructions. A network I/F (interface) 106 and a printer I/F 107 are interfaces for connecting the laser beam printer 300 and the host computer 100 through Ethernet (registered trademark) 400a or a dedicated interface 400b and transmitting and receiving data between the laser beam printer 300 and the host computer 100. A monitor I/F 108 is an interface for connecting a monitor 110 and the main body of the host computer 100 and transferring display data from the main body of the host computer 100 to the monitor 110. Reference numeral 109 denotes a system bus (common data bus).

Figure 3:
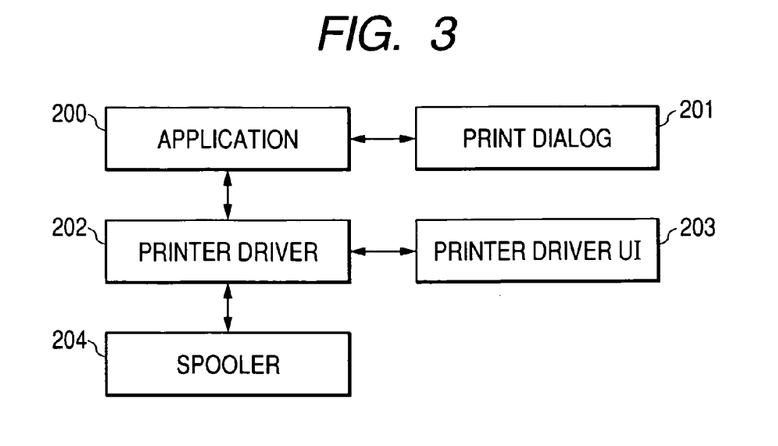
FIG. 3 shows the embodiment of the invention and is a diagram showing an example of a general system in the host computer by a module construction.

FIG. 3 is a diagram showing an example of a general system in the host computer 100 by a module construction.

In FIG. 3, an application 200 is software to form print data on the basis of the user's operation of the keyboard 104 or the like. The application 200 issues, for example, an instruction command of the print setting, a page control command, a draw command, and the like upon execution of the printing.

A print dialog 201 is a user interface which is displayed on the monitor 110 during the execution of the application 200. The print dialog 201 has a role for allowing the user to input the print setting by using the keyboard 104 or the like in an interactive manner and, further, instruct the execution of the printing. A printer driver 202 is software for controlling the laser beam printer 300. The printer driver 202 transmits and receives print setting information to/from the application 200 and converts it into the print data including a page description language and a job description language in accordance with the draw command or the like issued by the application 200.

A printer driver UI (User Interface) 203 is a dedicated user interface of the printer driver 202 and can be called from the process of the application 200 and displayed. The printer driver UI 203 has a role for allowing the user to input the print setting in an interactive manner. A spooler 204 provides print services such as scheduling of the print jobs and transmission to the printer.

The following relation exists between the print dialog 201 and the printer driver UI 203. Generally, it is a main object of the print dialog 201 to allow the user to input the print setting specified to the application 200 such as range of a page to be printed, special layout method, or the like and it is a main object of the printer driver UI 203 to allow the user to input the print setting specified to the functions of the laser beam printer 300 such as staple-binding, color adjustment, and the like.

In the embodiment, however, it is assumed that the user is allowed to make the print setting of the staple-binding only through the print dialog 201 of the application 200 and the printer driver UI 203 is not used for the print setting of the staple-binding. It is, therefore, assumed that the print dialog 201 has a print setting item of the staple-binding as a user interface as shown in FIG. 4.

Figure 5:
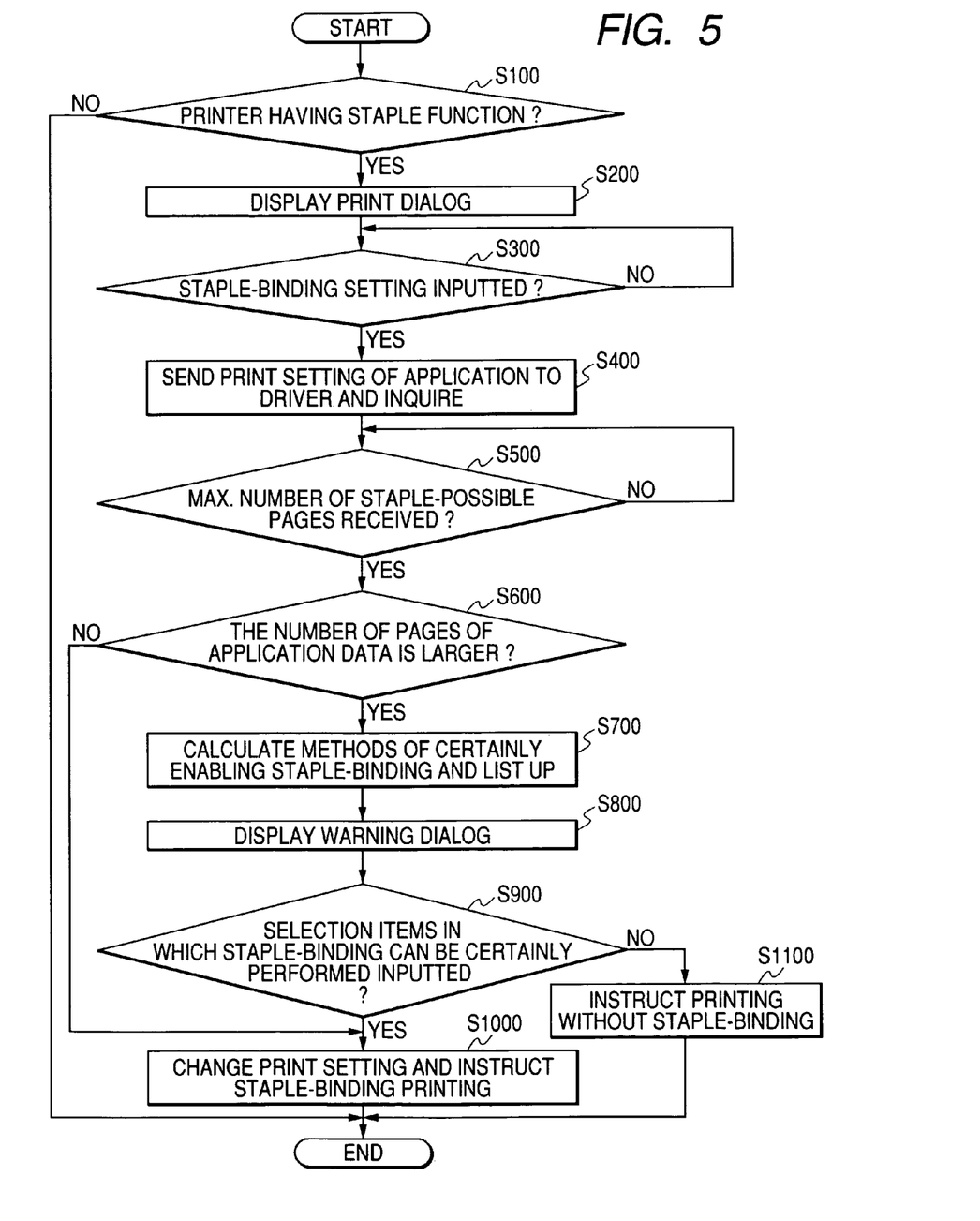
FIG. 5 shows the embodiment of the invention and is a flowchart for explaining an example of a flow for processes which are executed by an application in the case of performing a staple-binding to an original.
Figure 6:
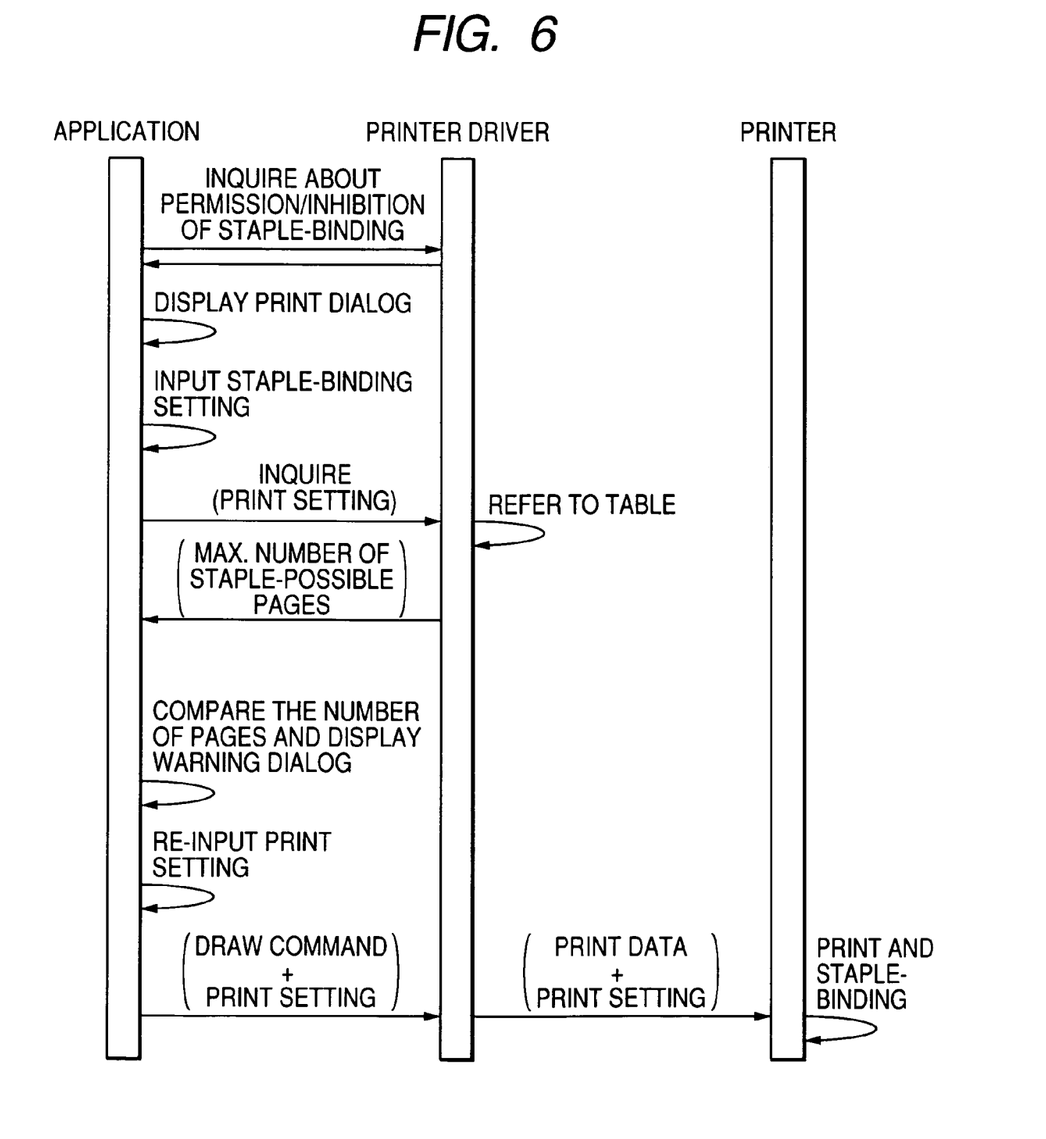
FIG. 6 shows the embodiment of the invention and is a diagram showing an example of a flow for processes which are executed by the application, a printer driver, and a laser beam printer until the printing is finished after a print start was instructed.

An example of a print control method in the case of performing the staple-binding to an original by using the print system of the embodiment will be explained. FIG. 5 is a flowchart for explaining an example of a flow for processes which are executed in the application 200 in the case of performing the staple-binding to the original. FIG. 6 is a diagram showing an example of a flow for processes which are executed by the application 200, printer driver 202, and laser beam printer 300 until the printing is finished after the print start was instructed.

First, in step S100, the application 200 inquires of the printer driver 202 about the presence or absence of the setting item regarding the staple-binding by using the API or the like. On the basis of a result of the inquiry, whether or not the setting item regarding the staple-binding exists in the printer driver 202 is discriminated. As a result of the discrimination, if the setting item regarding the staple-binding does not exist, this means that it is impossible to make control of the staple-binding. Therefore, the system is changed to a mode in which the user cannot input the setting item of the staple-binding on the print dialog 201, and the processing routine is finished.

Figure 4:
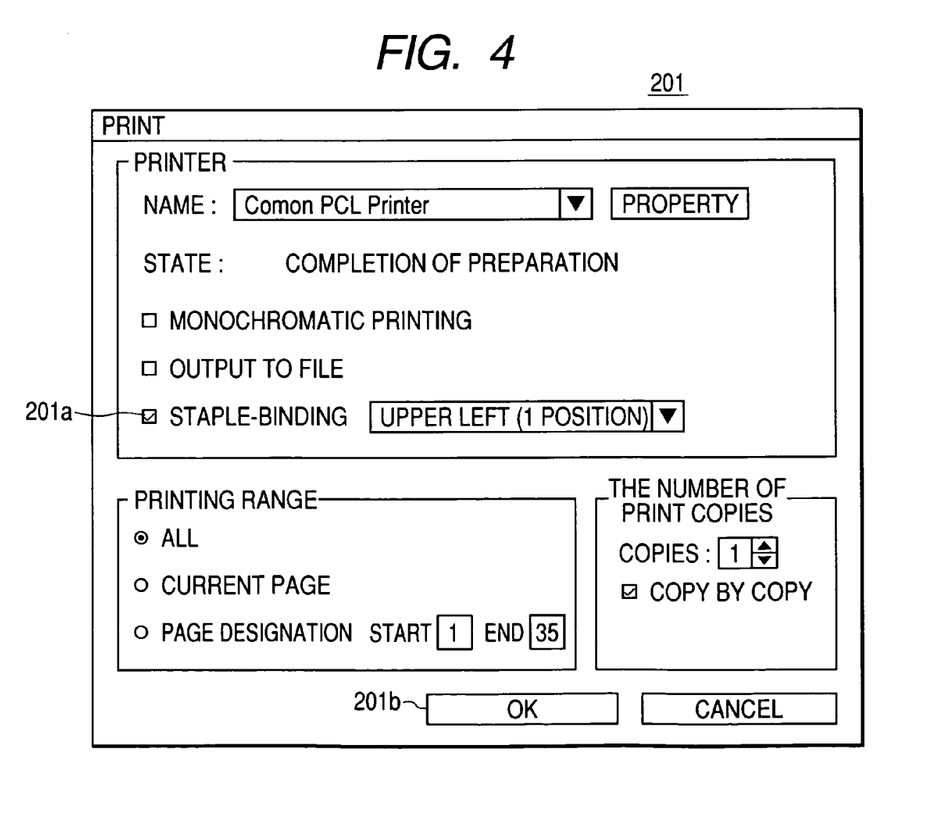
FIG. 4 shows the embodiment of the invention and is a diagram showing an example of a user interface of a print dialog.

If the setting item regarding the staple-binding exists, step S200 follows and the application 200 displays the print dialog 201 as shown in FIG. 4 onto the monitor 110.

In next step S300, the application 200 discriminates whether or not the print setting of the staple-binding has been inputted on the basis of the operation of the user using the mouse or the like. In the example shown in FIG. 4, a check box 201a to decide whether or not the stapling is executed is marked. After selection or the like of an item regarding a stapling position is executed, whether or not an OK button 201b has been pressed is discriminated.

Figure 7:
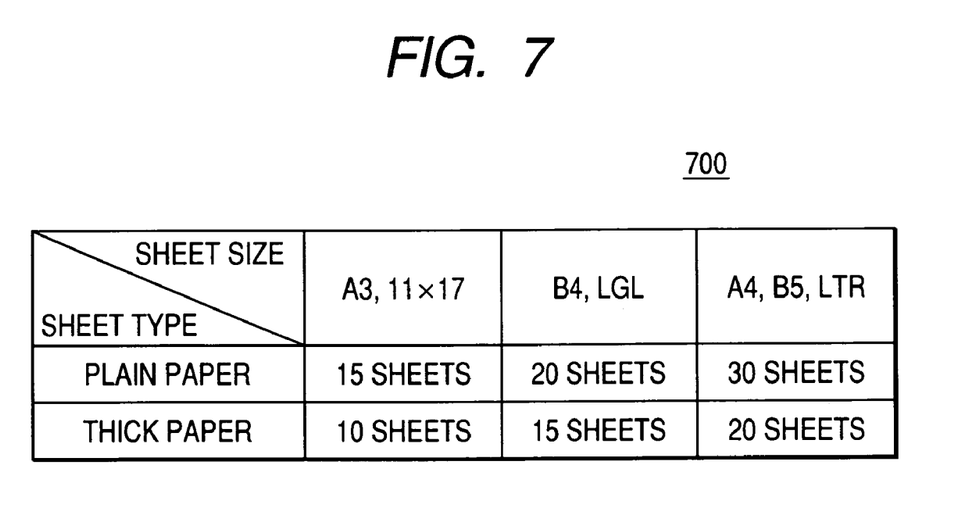
FIG. 7 shows the embodiment of the invention and is a diagram showing an example of a table in which the maximum number of pages which can be stapled has been stored.

Subsequently, in step S400, the application 200 transfers the present print setting including permission/inhibition of the staple-binding, sheet size, sheet type, and the like as an input to the printer driver 202 through the interface which has previously been provided, and inquires of the printer driver 202 about the maximum number of pages which can be stapled. In accordance with a result of the inquiry, the printer driver 202 searches for the value of the maximum number of pages which can be stapled in the print setting inputted to the application 200 with reference to a table 700 (as shown in FIG. 7) which has previously been stored in the printer driver 202 and in which the maximum number of pages which can be stapled has been stored, and returns a result of the search to the application 200. In the example of the table 700 shown in FIG. 7, the maximum number of pages which can be stapled has been predetermined every sheet size and every sheet type. For example, when the print setting in which the sheet size is assumed to be A4 and the sheet type is assumed to be thick paper is inputted, the maximum number of pages which can be stapled is equal to 20.

In next step S500, the application 200 receives the maximum number of staple-possible pages searched for by the printer driver 202 in accordance with the inquiry in step S400.

Subsequently, in step S600, the application 200 compares the maximum number of staple-possible pages received by the process of step S500 with the number of pages of the data of the original to be printed by the user through the application 200. It should be noted here that the application 200 has to compare the number of physical pages of the original to be actually printed with the maximum number of staple-possible pages received by the process of step S500.

For example, in the case of a process in which, in the application 200 which forms a presentation, the user selects the setting for allocating three pages of a document of 10 pages to one sheet of paper (3up printing) and the 3up printing is allocated by the application 200, the application 200 has to set the number of pages to be issued to 4. The application 200 compares the number of physical pages of the original calculated as mentioned above with the maximum number of staple-possible pages. If the number of physical pages of the original is larger, that is, if the staple-binding is not executed in the current print setting, the processing routine advances to step S700. If NO, step S1000 follows.

In step S700, the application 200 calculates one or more print settings in which the staple-binding can be performed by the laser beam printer 300 and displays a list of them. That is, the application 200 calculates the number of output sheets in the case where the page allocation setting such as Nup printing (N=2, 4, 8, 16, . . . ) or duplex printing which can be realized by one of the application 200, printer driver 202, and laser beam printer 300 among the print settings designated by the user is temporarily applied. When the calculated value of the number of output sheets is equal to or less than the maximum number of staple-possible pages received in step S500, a set of the print setting and the number of output sheets is stored. When the number of stored sets of the print settings in which the staple-binding is possible and the number of output sheets reaches a predetermined value, the calculation is stopped and the processing routine advances to step S800.

Figure 8:
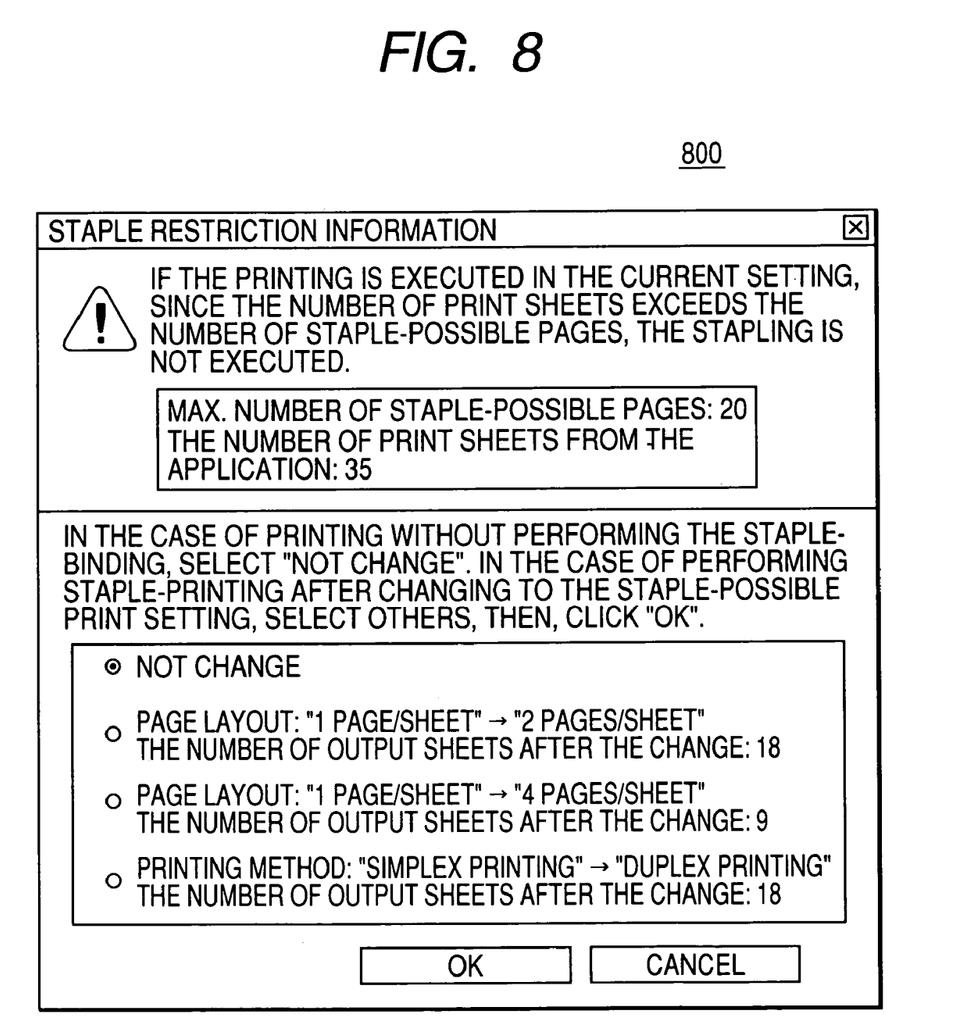
FIG. 8 shows the embodiment of the invention and is a diagram showing an example of a user interface of a warning dialog.

In step S800, the application 200 displays a warning dialog 800 as shown in FIG. 8 onto the monitor 110. In an upper portion of the warning dialog 800, a message to warn that the number of pages of the original data of the user exceeds the maximum number of pages which can be stapled is displayed. In a lower portion of the warning dialog 800, a plurality of selection items to decide the processes after step S800 are listed as input items. In the example shown in FIG. 8, for instance, the input items such as "Not changed" and "Page layout: "1 page/sheet"→"2 pages/sheet", The number of output sheets after the change: 18" are dynamically formed as selection items and listed on the warning dialog 800.

"Not changed" is a default selection item and denotes that the printing is executed as it is without performing the staple-binding. "Page layout: "1 page/sheet"–+"2 pages/sheet", The number of output sheets after the change: 18" denotes that the page layout in which one logic page is formed onto one sheet of paper is changed to the page layout in which two logic pages are formed onto one sheet of paper and the number of output sheets after the change is equal to 18. This input item is dynamically formed from the information and is concerned with the set of the staple-binding possible print setting stored in step S700 and the number of output sheets.

In next step S900, the application 200 discriminates whether or not the input item (selection item) such as "Page layout: "1 page/sheet"→"2 pages/sheet", . . . " or the like in which the staple-binding can be certainly performed has been inputted by the operation of the mouse or the like by the user. If it is determined as a result of the discrimination that it has been inputted, step S1000 follows. If the input item "Not changed" is inputted, step S1100 follows.

When the input item (selection item) in which the staple-binding can be certainly performed is inputted and the processing routine advances to step S1000, on the basis of the input item (selection item) decided that it has been inputted in step S900, the application 200 changes the setting regarding the Nup printing or duplex printing among the print settings preliminarily stored in the application 200 and issues the draw command to the printer driver 202.

An example of the process in step S1000 will be specifically explained. For example, when the user selects the mode to execute the Nup printing which can be realized by the application 200, the application 200 issues the draw command to execute the selected Nup printing to the printer driver 202. When the user selects the mode to execute the Nup printing which cannot be realized by the application 200, that is, the Nup printing which can be realized by the printer driver 202 or the laser beam printer 300, the application 200 issues the draw command to execute the 1up printing to the printer driver 202 and then the desired Nup printing is executed by the printer driver 202 or the laser beam printer 300.

When the input item (selection item) in which the staple-binding can be certainly performed is not inputted but the input item "Not changed" is inputted in step S900, step S1100 follows. The application 200 changes the setting of the staple-binding to "Staple-binding is not performed" among the print settings preliminarily stored in the application 200 and issues the draw command to the printer driver 202.

As mentioned above, in the embodiment, to allow the user to make the print setting, if the user designates the execution of the staple-binding after the print dialog 201 is displayed, the application 200 inquires of the printer driver 202 about the maximum number of pages which can be staple-bound (the maximum number of staple-possible pages) by the laser beam printer 300 and compares the number of staple-binding originals designated by the user with the maximum number of staple-possible pages. On the basis of a result of the comparison, if it is determined that the job to be issued by the user is a job in which the staple-binding is impossible, the application 200 displays the warning dialog 800 onto the monitor 110, thereby notifying the user that the staple-binding is impossible according to the current setting and also notifying him of candidates of the setting in which the staple-binding can be certainly performed. The printing process is executed by the print setting selected by the user from the candidates of the print setting including the setting in which the staple-binding can be certainly performed. By this method, either the output in which the print sheets have been staple-bound or the output in which they are not staple-bound can be obtained by the laser beam printer 300 in accordance with the setting (input item) of the user and the original can be outputted in a user's desired format as much as possible.

Other Embodiments of the Invention

The invention also incorporates the case where, in order to make various devices operative so as to realize the functions of the embodiment mentioned above, program codes of software to realize the functions of the foregoing embodiment are supplied to a computer in an apparatus or a system connected to those various devices, and the invention is embodied by making the various devices operative in accordance with a program stored in the computer (a CPU or an MPU) of the system or the apparatus.

In this case, the program codes themselves of the software realize the functions of the embodiment mentioned above and the program codes themselves and means for supplying the program codes to the computer, for example, the recording medium in which the program codes have been stored construct the invention. As a recording medium in which the program codes are stored, for example, a flexible disk, a hard disk, an optical disk, a magnetooptic disk, a CD-ROM, a magnetic tape, a non-volatile memory card, a ROM, or the like can be used.

Naturally, the program codes are also incorporated in the embodiments of the invention not only in the case where the computer executes the supplied program codes, so that the functions of the foregoing embodiment are realized but also in the case where the functions of the foregoing embodiment are realized by the program codes in cooperation with the OS (Operating System) which is operating in the computer, another application software, or the like.

Further, naturally, the invention incorporates the case where the supplied program codes are stored into a memory provided for a function expanding board of a computer or a function expanding unit connected to the computer, thereafter, a CPU or the like provided for the function expanding board or the function expanding unit executes a part or all of actual processes on the basis of instructions of the program codes, and the functions of the foregoing embodiment are realized by those processes.

As many apparently widely different embodiments of the present invention can be made without departing from the spirit and scope thereof, it is to be understood that the invention is not limited to the specific embodiments thereof except as defined in the appended claims.

According to the invention, the application inquires of the printer driver about the restriction value of the printing apparatus in the case of executing the printing process in accordance with the print setting designated by the user. On the basis of the inquiry result and the number of print sheets of the print document, if the application determines that the printing process cannot be executed according to the print setting designated by the user, a message showing that the printing process cannot be executed is displayed onto the displaying apparatus. Therefore, prior to executing the print output, the user can recognize from the application the fact that the print sheets cannot be processed by the setting designated by himself. Thus, such a situation that the print sheet is outputted in the format different from the setting designated by the user can be prevented as much as possible.

According to another feature of the invention, if it is determined that the printing process cannot be executed in accordance with the print setting designated by the user, the message showing that the printing process cannot be executed and the candidates of the setting by which the printing process can be executed are displayed on the displaying apparatus. Therefore, the user can recognize the setting which is closer to the setting designated by himself. Thus, the printing process can be executed more easily and certainly in accordance with the setting which is closer to the setting designated first by the user.

This application claims priority from Japanese Patent Application No. 2004-223254 filed on Jul. 30, 2004, which is hereby incorporated by reference herein.

What is claimed is:

1. An information processing apparatus as a host computer having an application for making a user designate print setting to execute a printing process of a print document and a printer driver for controlling a printing apparatus comprising:
    an inquiry unit adapted to inquire of the printer driver by the application about a restriction value of the printing apparatus in the case of executing the printing process in accordance with the print setting designated by the user;
    an obtaining unit adapted to obtain print restriction value information, as a reply to the inquiry by said inquiry unit, regarding the restriction value of the printing apparatus in the case of executing the printing process in accordance with the print setting designated by the user from the printer driver;
    a discriminating unit adapted to discriminate whether or not the printing process can be executed in accordance with the print setting designated by the user on the basis of the print restriction value information obtained by said obtaining unit and the number of pages of the print document;
    a display control unit adapted to display a message showing that it is impossible to execute the printing process to a displaying apparatus if it is determined by said discriminating unit that the printing process cannot be executed; and
    a table in which the staple-possible number information has been stored every attribute of the sheet,
    wherein, when inquiring of the printer driver about the maximum number of pages which can be bound by the stapler, said inquiry unit outputs the attribute of the sheet designated by the user to the printer driver,
    wherein the printer driver has an output unit adapted to output, to the application, the staple-possible number information stored in the table in correspondence to the attribute of the sheet outputted by said inquiry unit,
    wherein the print setting is the setting for binding print sheets by a stapler,
    wherein said inquiry unit inquires of the printer driver about the maximum number of pages which can be bound by the stapler,
    wherein said obtaining unit obtains, from the printer driver, staple-possible number information indicative of the maximum number of pages which can be bound by the stapler, and
    wherein, on the basis of the staple-possible number information obtained by said obtaining unit, said discriminating unit discriminates whether or not the print sheets of the number designated by the user can be bound by the stapler.

2. An apparatus according to claim 1, wherein the attribute of the sheet includes a size and a thickness of the sheet.

3. A print processing method carried out in an information processing apparatus having an application for making a user designate print setting to execute a printing process of a print document and a printer driver for controlling a printing apparatus, comprising:
    inquiring of the printer driver by the application about a restriction value of the printing apparatus in the case of executing the printing process in accordance with the print setting designated by the user;
    obtaining, from the printer driver by the application, print restriction value information, as a reply to the inquiry in said inquiry step, regarding the restriction value of the printing apparatus in the case of executing the printing process in accordance with the print setting designated by the user;
    discriminating, by the application, whether or not the printing process can be executed in accordance with the print setting designated by the user on the basis of the print restriction value information obtained in said obtaining step and the number of pages of the print document; and
    displaying a message showing that it is impossible to execute the printing process onto a displaying apparatus if it is determined by said discriminating step that the printing process cannot be executed,
    wherein, in said inquiry step, when the application inquires of the printer driver about the maximum number of pages which can be bound by the stapler, an attribute of the sheet designated by the user is outputted to the printer driver from the application,
    wherein, in said obtaining step, the application obtains the staple-possible number information stored in a table in correspondence to the attribute of the sheet outputted in said inquiry step from the printer driver and obtains staple-possible number information indicative of the maximum number of pages which can be bound by the stapler from the printer driver,
    wherein the print setting is the setting for binding print sheets by a stapler, wherein, in said inquiry step, the application inquires of the printer driver about the maximum number of pages which can be bound by the stapler, and wherein, in said discriminating step. whether or not the print sheets of the number designated by the user can be bound by the stapler is discriminated on the basis of the staple-possible number information obtained in said obtaining step.

4. A method according to claim 3, wherein the attribute of the sheet includes a size and a thickness of the sheet.

5. A computer program stored on a computer-readable storage medium such that, when executed by a computer, said program causes the computer to execute a print processing method carried out in an information processing apparatus having an application for making a user designate print setting to execute a printing process of a print document and a printer driver for controlling a printing apparatus, wherein the method comprises:

inquiring of the printer driver by the application about a restriction value of the printing apparatus in the case of executing the printing process in accordance with the print setting designated by the user;

obtaining, from the printer driver by the application, print restriction value information, as a reply to the inquiry in said inquiry step, regarding the restriction value of the printing apparatus in the case of executing the printing process in accordance with the print setting designated by the user;

discriminating, by the application, whether or not the printing process can be executed in accordance with the print setting designated by the user on the basis of the print restriction value information obtained in said obtaining step and the number of pages of the print document; and displaying a message showing that it is impossible to execute the printing process onto a displaying apparatus if it is determined by said discriminating step that the printing process cannot be executed, wherein, in said inquiry step, when the application inquires of the printer driver about the maximum number of pages which can be bound by the stapler, an attribute of the sheet designated by the user is outputted to the printer driver from the application, wherein, in said obtaining step, the application obtains the staple-possible number information stored in a table in correspondence to the attribute of the sheet outputted in said inquiry step from the printer driver and obtains staple-possible number information indicative of the maximum number of pages which can be bound by the stapler from the printer driver, wherein the print setting is the setting for binding print sheets by a stapler, wherein, in said inquiry step, the application inquires of the printer driver about the maximum number of pages which can be bound by the stapler, and wherein, in said discriminating step, whether or not the print sheets of the number designated by the user can be bound by the stapler is discriminated on the basis of the staple-possible number information obtained in said obtaining step.

6. A program according to claim 5, wherein the attribute of the sheet includes a size and a thickness of the sheet.

* * * * *